(12) United States Patent
Abe et al.

(10) Patent No.: US 10,177,599 B2
(45) Date of Patent: Jan. 8, 2019

(54) CONTACTLESS POWER FEEDING SYSTEM, MOVABLE DEVICE AND METHOD FOR CONTROLLING POWER FEEDING OF CONTACTLESS POWER FEEDING SYSTEM

(71) Applicant: Panasonic Intellectual Property Management Co., Ltd., Osaka (JP)

(72) Inventors: Hideaki Abe, Osaka (JP); Toyohiko Tsujimoto, Osaka (JP); Mamoru Ozaki, Osaka (JP); Hiroshi Kohara, Osaka (JP); Toshihiro Akiyama, Osaka (JP); Akira Yabuta, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 663 days.

(21) Appl. No.: 14/438,621

(22) PCT Filed: Oct. 3, 2013

(86) PCT No.: PCT/JP2013/005915
§ 371 (c)(1),
(2) Date: Apr. 25, 2015

(87) PCT Pub. No.: WO2014/068849
PCT Pub. Date: May 8, 2014

(65) Prior Publication Data
US 2015/0255992 A1 Sep. 10, 2015

(30) Foreign Application Priority Data
Oct. 31, 2012 (JP) .................................. 2012-240459

(51) Int. Cl.
*H02J 50/00* (2016.01)
*H02J 50/10* (2016.01)
(Continued)

(52) U.S. Cl.
CPC .............. *H02J 50/10* (2016.02); *H01F 38/14* (2013.01); *H02J 5/005* (2013.01); *H02J 7/00* (2013.01);
(Continued)

(58) Field of Classification Search
CPC ...... H02J 9/62; H02J 7/34; H02J 50/00; H02J 17/00
(Continued)

(56) References Cited

U.S. PATENT DOCUMENTS

| 5,709,291 A | 1/1998 | Nishino et al. |
| 2004/0183640 A1 | 9/2004 | Bohler et al. |

(Continued)

FOREIGN PATENT DOCUMENTS

| JP | 60-58198 A | 4/1985 |
| JP | H5-338765 A | 12/1993 |

(Continued)

OTHER PUBLICATIONS

International Search Report for corresponding International Application No. PCT/JP2013/005915 dated Nov. 12, 2013.
(Continued)

*Primary Examiner* — Rexford Barnie
*Assistant Examiner* — Joseph Inge
(74) *Attorney, Agent, or Firm* — Renner, Otto, Boisselle & Sklar, LLP

(57) ABSTRACT

A contactless power feeding system comprises a power feeding device and a movable device. The movable device is installed on a power feeding case of the power feeding device, and a liquid crystal TV (E) is installed on the movable device. The liquid crystal TV (E) can be arranged at a desired position on a wall (W) in a room (R) by moving the movable device along the power feeding case. The liquid crystal TV (E) can be arranged at a desired height by moving
(Continued)

the liquid crystal TV (E) in the axial direction of a guide pipe provided on a power receiving case. The liquid crystal TV (E) can be directed in a desired direction by rotating the liquid crystal TV (E) around the guide pipe. The contactless power feeding system feeds power to the liquid crystal TV (E) via the power feeding device and the movable device.

20 Claims, 14 Drawing Sheets

(51) Int. Cl.
    *H02J 50/60* (2016.01)
    *H01F 38/14* (2006.01)
    *H02J 5/00* (2016.01)
    *H02J 7/00* (2006.01)
    *H02J 17/00* (2006.01)
    *H02J 50/90* (2016.01)

(52) U.S. Cl.
    CPC .............. *H02J 17/00* (2013.01); *H02J 50/60* (2016.02); *H02J 50/90* (2016.02)

(58) Field of Classification Search
    USPC .................................................. 307/65, 104
    See application file for complete search history.

(56) References Cited

U.S. PATENT DOCUMENTS

| | | | |
|---|---|---|---|
| 2009/0160262 A1* | 6/2009 | Schmidt .............. | H01F 27/2847 307/104 |
| 2010/0219183 A1 | 9/2010 | Azancot et al. | |
| 2010/0219693 A1 | 9/2010 | Azancot et al. | |
| 2010/0244578 A1 | 9/2010 | Yoshikawa | |
| 2010/0244584 A1 | 9/2010 | Azancot et al. | |
| 2010/0259401 A1 | 10/2010 | Azancot et al. | |
| 2011/0298419 A1* | 12/2011 | Tsai ....................... | H01M 10/46 320/108 |
| 2013/0127254 A1* | 5/2013 | Miichi .................... | H01F 38/14 307/104 |
| 2013/0175877 A1 | 7/2013 | Abe et al. | |
| 2014/0008996 A1 | 1/2014 | Iwasa et al. | |
| 2014/0361633 A1* | 12/2014 | Abe ........................ | H01F 38/14 307/104 |

FOREIGN PATENT DOCUMENTS

| | | | | |
|---|---|---|---|---|
| JP | 2003-204637 A | | 7/2003 | |
| JP | 2007-174892 A | | 7/2007 | |
| JP | 2009-159675 A | | 7/2009 | |
| JP | 2009-159683 A | | 7/2009 | |
| JP | 2010-239847 A | | 10/2010 | |
| JP | 2010-279198 A | | 12/2010 | |
| JP | 2010-283913 A | | 12/2010 | |
| JP | 2011/030418 A | | 2/2011 | |
| JP | 2011-055669 A | | 3/2011 | |
| JP | 2011-151901 A | | 8/2011 | |
| JP | 2012-161110 A | | 8/2012 | |
| JP | 2013070477 A | * | 4/2013 | ............. H01F 38/14 |
| WO | WO 2012/133762 A1 | | 10/2012 | |

OTHER PUBLICATIONS

Extended European Search Report dated Nov. 5, 2015 for corresponding European Application No. 13851742.0.
International Preliminary Report on Patentability for corresponding International Application No. PCT/JP2013/005915 dated May 5, 2015 (English translation).
Notification of Reasons for Refusal dated Oct. 13, 2015 for corresponding Japanese Application No. 2012-240459 and English translation.

* cited by examiner

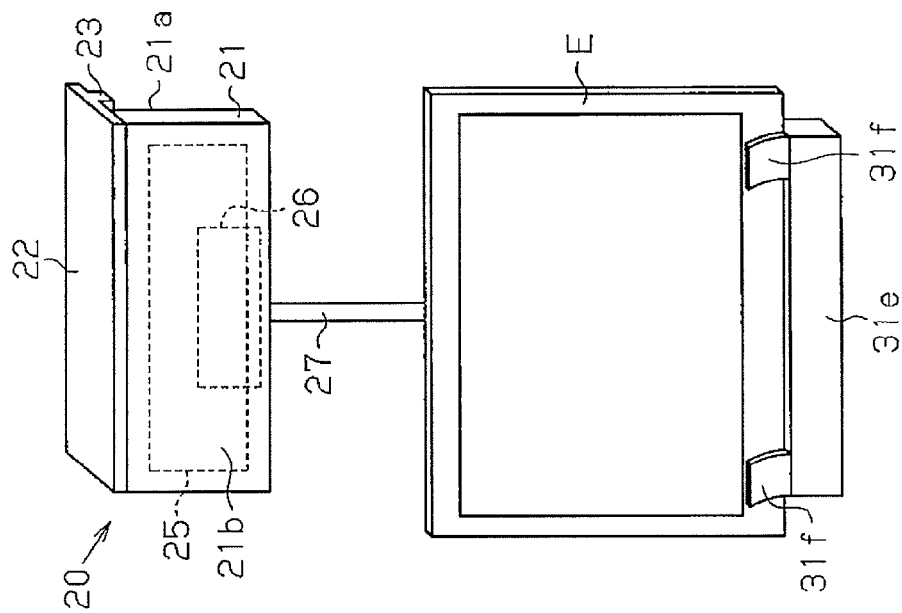
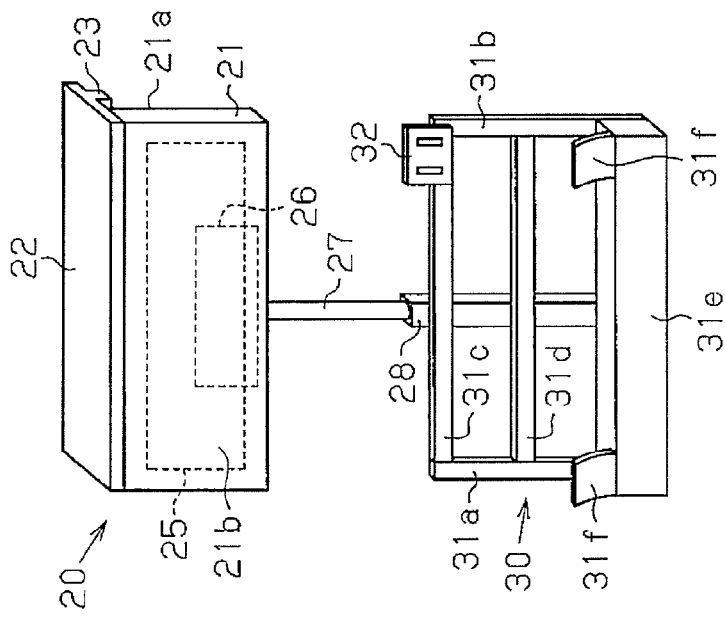

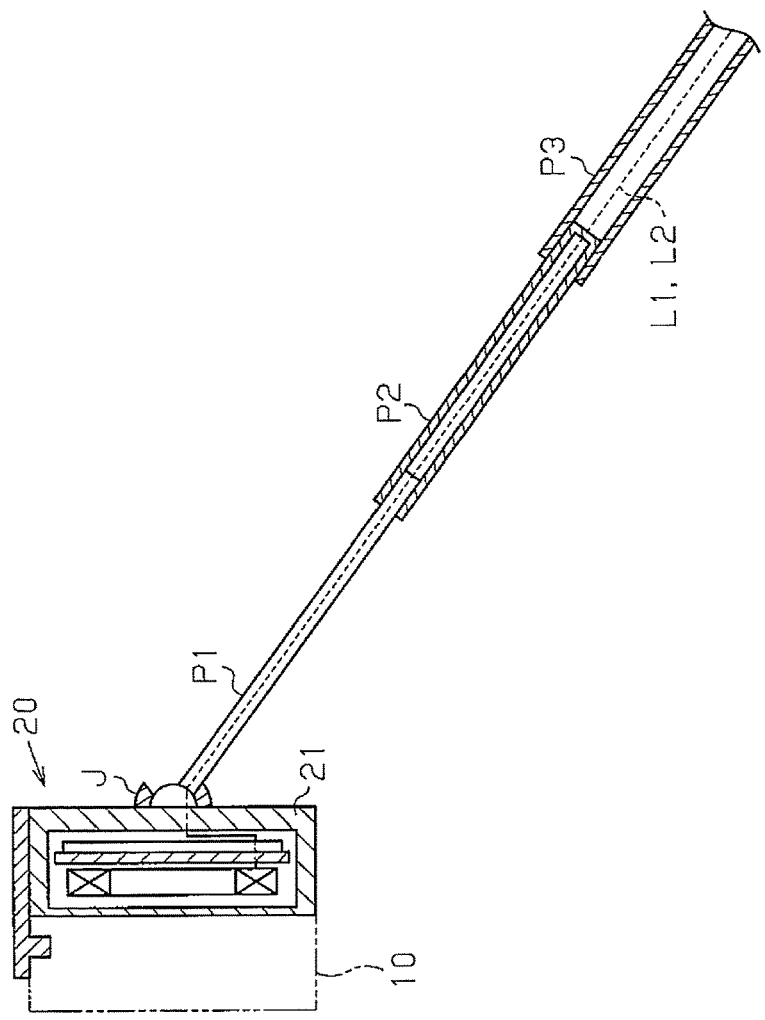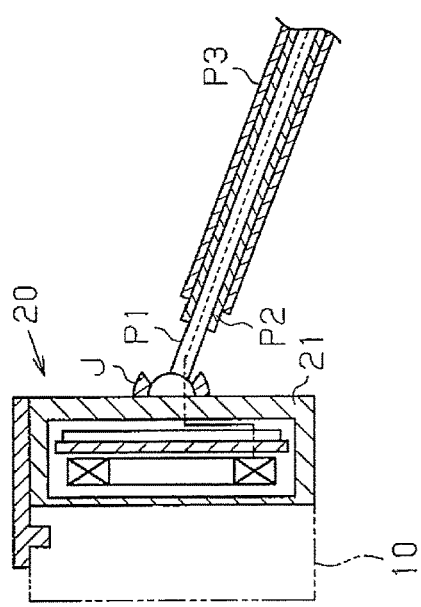

Fig.18A  Fig.18B  Fig.18C
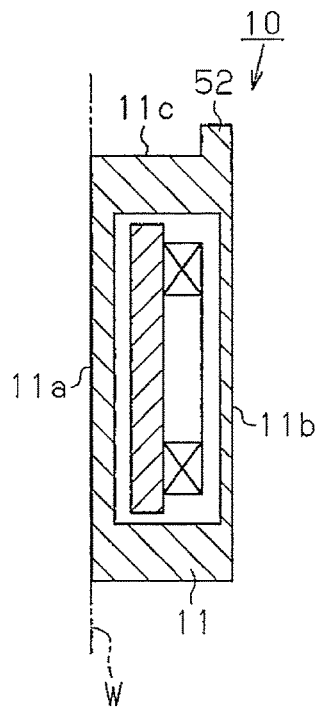
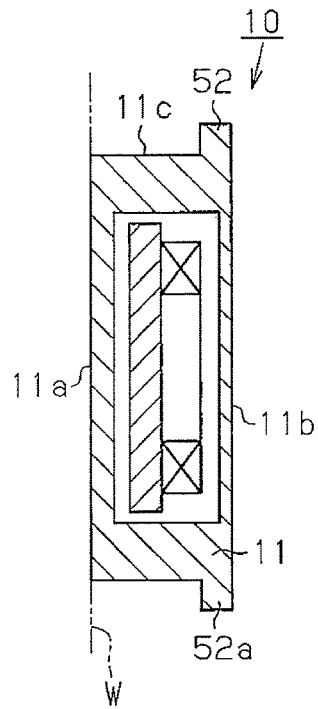
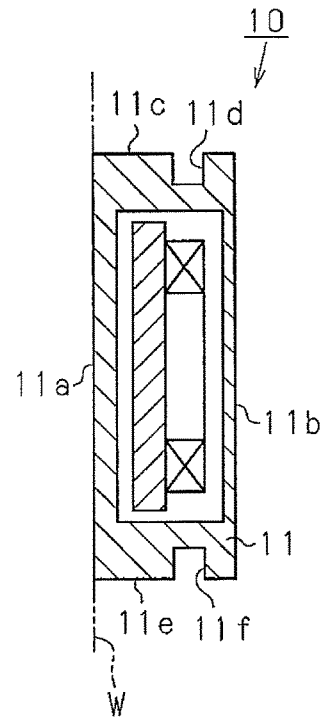
Fig.19A
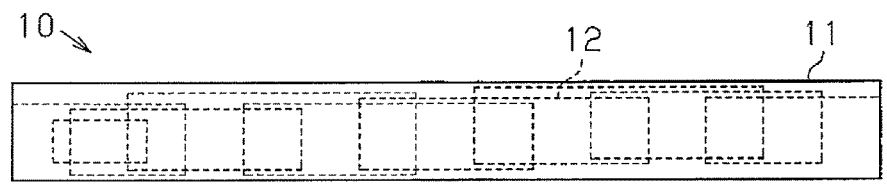
Fig.19B
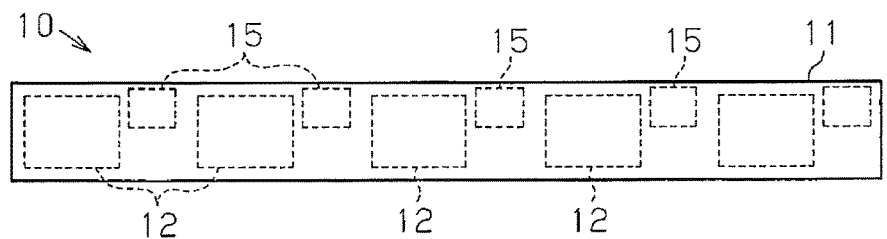

CONTACTLESS POWER FEEDING SYSTEM, MOVABLE DEVICE AND METHOD FOR CONTROLLING POWER FEEDING OF CONTACTLESS POWER FEEDING SYSTEM

TECHNICAL FIELD

The present invention relates to a contactless power supplying system, a movable device, and a method of controlling the supply of power to the contactless power supplying system.

BACKGROUND ART

Patent Document 1 discloses, for example, a contactless system that supplies power from a power supplying device to a power receiving device in a contactless manner. The contactless power supplying system delivers high-frequency current to a primary coil and supplies power to an electronic device through a secondary coil using electromagnetic induction. This system does not require a conventional electric cord that connects a power supply and an electronic device. Patent Document 2 discloses an example of a technique for applying a contactless power supplying system to a household.

PRIOR ART DOCUMENT

Patent Document

Patent Document 1: Japanese Laid-Open Patent Publication No. 2003-204637
Patent Document 2: Japanese Laid-Open Patent Publication No. 2009-159683

SUMMARY OF THE INVENTION

It is an object of the present invention to provide a contactless power supplying system that increases the degree of layout freedom and is capable of supplying power to a dedicated electronic device incorporating a secondary coil as well as a conventional electronic device that does not incorporate a secondary coil.

A contactless power supplying system according to one aspect of the present invention includes a power supplying device and a movable device. The power supplying device includes a power supplying housing including a power supplying surface that extends in a certain direction and a primary coil arranged in the power supplying housing extending in the certain direction, in which the primary coil generates alternating flux when receiving high-frequency current. The movable device includes a power receiving housing including a power receiving surface, a coupling member arranged on the power receiving housing so that the power receiving housing is arranged at a certain position where the power receiving surface faces the power supplying surface, a secondary coil arranged in the power receiving housing, in which the secondary coil interlinks with the alternating flux and generates induced voltage, a power circuit arranged in the power receiving housing, in which the power circuit generates output voltage from the induced voltage, and an output terminal extending out of the power receiving housing via a connection wire, in which the output terminal outputs the output voltage of the power circuit.

In one example, the primary coil faces the power supplying surface in the power supplying housing and forms a single elongated coil surface extending in the certain direction.

In one example, the primary coil forms a plurality of coil surfaces arranged in the certain direction in the power supplying device, and a middle position of one of the coil surfaces is deviated from a middle position of an adjacent coil surface in the certain direction.

In one example, the primary coil is an array of a plurality of primary coils arranged in the certain direction in the power supplying device, and each of the primary coils forms a coil surface that faces the power supplying surface.

It is preferred that the power supplying housing include a guide portion that guides movement of the power receiving housing and the position member in the certain direction.

It is preferred that the movable device include a position adjusting member that changes one or both of a position and a direction of the output terminal relative to the power receiving housing.

In one example, the output terminal is attached to the position adjusting member.

In one example, the contactless power supplying system includes a fixture arranged on the position adjusting member, in which the fixture holds an electronic device, and the output terminal is attached to the fixture.

The contactless power supplying system of one example is configured so that a plurality of the movable devices are arranged on the power supplying housing of the power supplying device.

It is preferred that the position member be configured to engage the power supplying housing so that the power receiving housing is arranged on the power supplying housing in a removable manner.

In one example, the movable device includes a power supplying port corresponding to a power plug or a connector of an electronic device, and the output terminal is an electrode of the power supplying port.

A contactless power supplying system according to a second aspect of the present invention is used with an electronic device and includes a power supplying device and a movable device. The power supplying device includes a power supplying housing including a power supplying surface that extends in a certain direction, and a primary coil including a coil surface arranged in the power supplying housing in the certain direction, in which the primary coil generates alternating flux when receiving high-frequency current. The movable device includes a power receiving housing including a power receiving surface, a coupling member arranged on the power receiving housing so that the power receiving housing is arranged at a certain position where the power receiving surface faces the power supplying surface, a position adjusting member connected to the power receiving housing to adjust one or both of a relative position and a relative angle of the power receiving housing and an electronic device, a secondary coil arranged in the power receiving housing, in which the secondary coil interlinks with the alternating flux and generates induced voltage, a power circuit arranged in the power receiving housing, in which the power circuit generates output voltage from the induced voltage output from the secondary coil, and an output terminal arranged in the power receiving housing, in which the output terminal outputs the output voltage of the power circuit.

In the above structure, it is preferred that the position adjusting member include a fixture that holds the electronic device and the power circuit and the output terminal be arranged in the fixture.

The contactless power supplying system of one example further includes a fixture arranged in the position adjusting member, in which the fixture holds the electronic device, and the power circuit and the output terminal are arranged in the fixture.

Another aspect of the invention relates to a movable device for use with a power supplying device, in which the power supplying device includes a power supplying housing, which includes a power supplying surface that extends in a certain direction, and a primary coil, which is arranged in the power supplying housing in the certain direction, the primary coil generating alternating flux when receiving high-frequency current. The movable device includes a power receiving housing including a power receiving surface, a coupling member arranged on the power receiving housing so that the power receiving housing is arranged at a certain position where the power receiving surface faces the power supplying surface, a secondary coil arranged in the power receiving housing, in which the secondary coil interlinks with the alternating flux and generates induced voltage, a power circuit arranged in the power receiving housing, in which the power circuit generates output voltage from the induced voltage, and an output terminal extending out of the power receiving housing via a connection wire, in which the output terminal outputs the output voltage of the power circuit.

In one example, the position member includes a guided portion configured to engage the power supplying housing.

The movable device of one example further includes a position adjusting member connected to the power receiving housing to change one or both of a position and a direction of the output terminal relative to the power receiving housing.

In one example, the output terminal is attached to the position adjusting member.

The contactless power supplying system of one example further includes a fixture arranged on the position adjusting member, in which the fixture holds an electronic device that receives power from the output terminal, and the output terminal is attached to the fixture.

In on example, a hanger is formed integrally with or suspended from the power receiving housing.

It is preferred that the hanger include a hanger body and a fan motor, which is arranged in the hanger body and connected to the output terminal, and the hanger body include a discharge hole that discharges a current, which is generated by the fan motor, out of the hanger body.

The movable device of one example further includes an indicator lamp that indicates a condition of power received from the power supplying device.

A further aspect of the present invention is directed to a method of controlling power supplied to a contactless power supplying system including a power supplying device including and a movable device. The power supplying housing including a power supplying surface that extends in a certain direction and a plurality of primary coils arranged in the power supplying housing in the certain direction, in which the plurality of primary coils generate alternating flux when receiving high-frequency current, and each of the primary coils forms a coil surface that faces the power supplying surface. The movable device includes a power receiving housing including a power receiving surface, a coupling member arranged in the power receiving housing so that the power receiving housing is arranged at a certain position where the power receiving surface faces the power supplying surface, a secondary coil arranged in the power receiving housing, in which the secondary coil interlinks with the alternating flux and generates induced voltage, a power circuit arranged in the power receiving housing, in which the power circuit generates output voltage from the induced voltage, and an output terminal that extends out of the power receiving housing via a connection wire, in which the output terminal outputs the output voltage of the power circuit. The method includes selectively supplying high-frequency current to the one of the plurality of primary coils that faces the power receiving surface of the power receiving surface.

BRIEF DESCRIPTION OF THE DRAWINGS

FIG. 4 is a perspective view of the movable device shown in FIG. 1.

FIG. 5 is a perspective view of the movable device shown in FIG. 4, on which a liquid crystal television is set.

FIGS. 14A and 14B are cross-sectional views each showing the movable device of the embodiment shown in FIG. 13.

FIGS. 18A, 18B, and 18C are cross-sectional views each showing a power supplying device in a further embodiment.

FIGS. 19A and 18B are cross-sectional views each showing a power supplying device in a further embodiment.

EMBODIMENTS OF THE INVENTION

Figure 1:
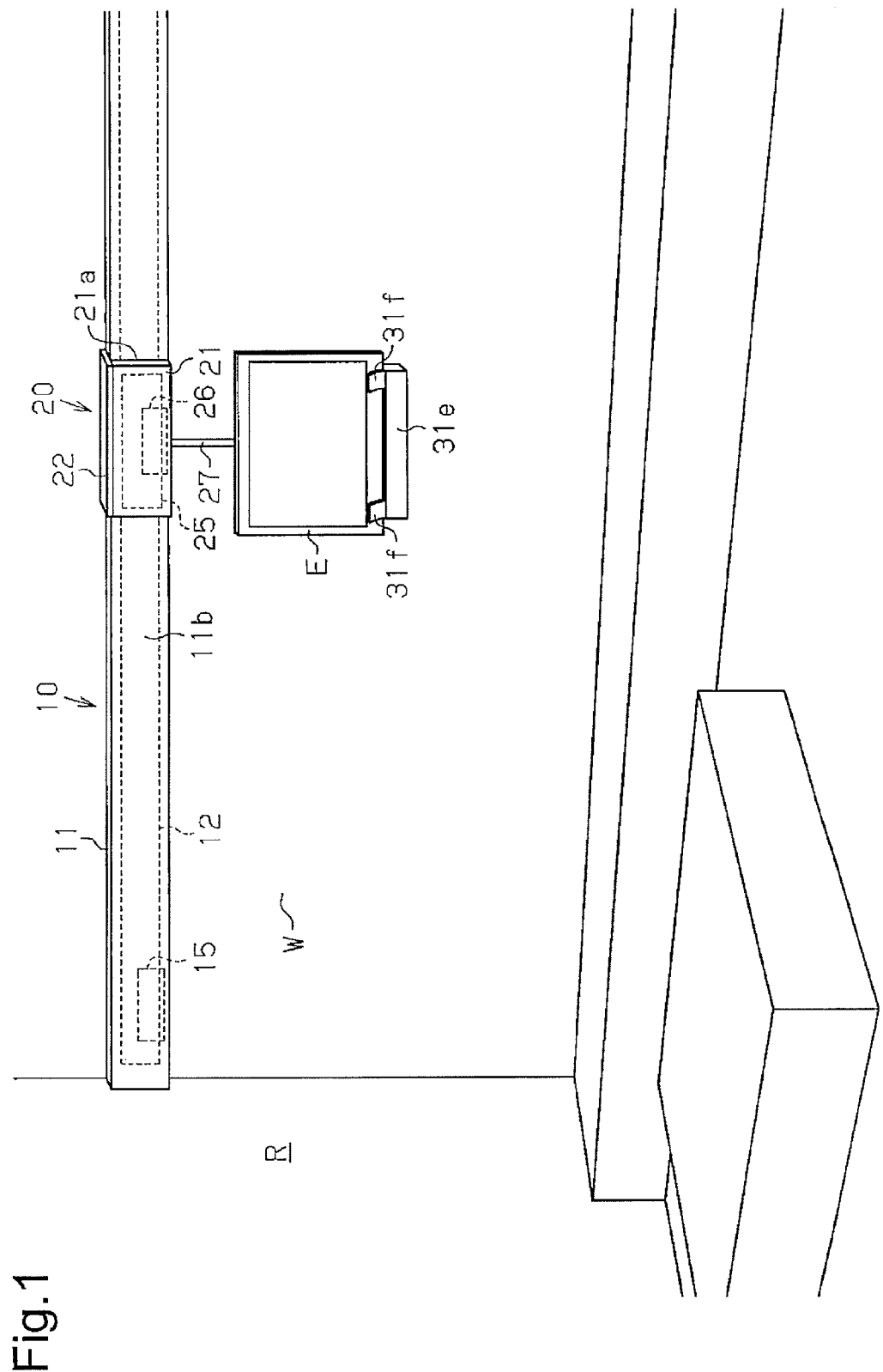
FIG. 1 is a perspective view showing a contactless power supplying system and an electronic device in one embodiment.

One embodiment will now be described with reference to FIGS. 1 to 6. As shown in FIG. 1, a contactless power supplying system includes a power supplying device 10 and a movable device 20. The power supplying device 10 is installed in a room R extending sideward and straight along a wall W. The movable device 20 is arranged on a housing 11 of the power supplying device 10 in a movable manner. A liquid crystal television E, which serves as an electronic device, is arranged on the movable device 20.

Figure 2:
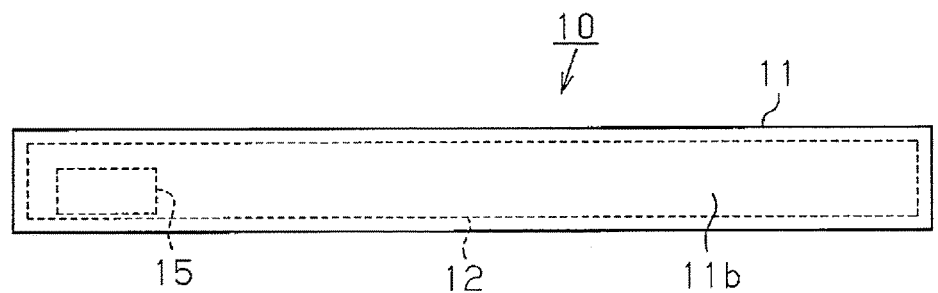
FIG. 2 is a front view of a power supplying device shown in FIG. 1.
Figure 3:
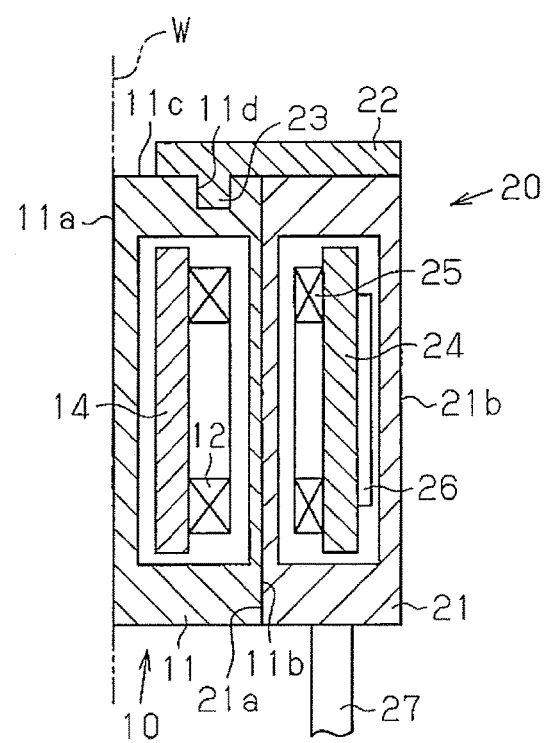
FIG. 3 is a cross-sectional view of the power supplying device and a movable device shown in FIG. 1.

The power supplying device 10 will now be described. As shown in FIGS. 1 to 3, the housing (hereinafter referred to as a power supplying housing) 11 of the power supplying device 10 has the form of an oblong box and is made of a synthetic resin. The power supplying housing 11 is rectangular, long in the vertical direction, and short in a front-to-rear direction (direction orthogonal to the wall W).

The power supplying housing 11 includes a rear surface fixed to the wall W (hereinafter referred to as a fixing surface 11*a*), a front surface that supplies power (hereinafter referred to as a power supplying surface 11*b*), and an upper surface on which the movable device 20 is arranged (hereinafter referred to as a coupling surface 11*c*). The coupling surface 11*c* includes a guide groove 11*d*, which is recessed straight in a longitudinal direction of the power supplying device 10.

As shown in FIG. 3, a single primary coil 12 is arranged near the power supplying surface 11*b* in the power supplying side housing 11. As shown by the broken line in FIG. 2, the primary coil 12 has the form of an elongated ring and extends in the longitudinal direction of the power supplying device 10. The primary coil 12 includes a coil surface that is parallel to the power supplying surface 11*b*. As shown by the broken line in FIG. 2, the power supplying housing 11 includes a high-frequency inverter 15. The high-frequency inverter 15 excites the primary coil 12 through a magnetic plate 14, which is located near the fixing surface 11*a*.

The high-frequency inverter 15 generates high-frequency current from a commercial power supply G (refer to FIG. 6) and supplies the high-frequency current to the primary coil 12. The primary coil 12 generates alternating flux when receiving the high-frequency current.

The movable device 20 will now be described. As shown in FIG. 1, the movable device 20 includes a housing (hereinafter referred to as the power receiving housing 21) arranged on the power supplying housing 11. The movable device 20 includes a coupling plate 22 on the upper surface of the power receiving housing 21. The coupling plate 22 includes a projection 23, which projects from the lower surface of the power receiving housing 21. The projection 23 is engaged in a movable manner with the guide groove 11*d* of the power supplying housing 11. The movable device 20 may be moved to a desired position in the longitudinal direction of the power supplying housing 11 with the projection 23 engaged with the guide groove 11*d* and guided by the guide groove 11*d*. The guide groove 11*d* and the projection 23 function as a guide portion and a guided portion, respectively. The coupling plate 22 functions as a coupling member.

The power receiving housing 21 has the form of a box and is made of a synthetic resin. The power receiving housing 21 includes an elongated front surface (hereinafter referred to as the ornamental surface 21*b*). In the example of FIG. 3, the vertical length of the power receiving housing 21 is set to be substantially the same as the vertical length of the power supplying surface 11*b*. The rear surface of the power receiving housing 21 (hereinafter referred to as the power receiving surface 21*a*) contacts the power supplying surface 11*b* of the power supplying housing 11.

The power receiving housing 21 and the coupling plate 22 are movable in the longitudinal direction of the power supplying device 10 while contacting the power supplying housing 11. It is preferred that the power receiving surface 21*a* of the power receiving housing 21 contact the power supplying surface 11*b* of the power supplying side housing 11 when moved. The movable device 20 may include a known stopper mechanism (not shown), which holds the movable device 20 at a desired position in the longitudinal direction of the power supplying device 10. The stopper mechanism is arranged in, for example, the coupling plate 22.

The power receiving surface 21*a* contacts the power supplying surface 11*b*, and the coupling plate 22 contacts the coupling surface 11*c*. The projection 23 engages with the guide groove 11*d*. This restricts separation of the movable device 20 from the power supplying housing 11. The movable device 20 may be removed from the power supplying housing 11 by lifting the power receiving housing 21 from the power receiving housing 11 and disengaging the projection 23 from the guide groove 11*d*.

As shown in FIGS. 1, 3 and 4, a secondary coil 25 is arranged near the power receiving surface 21*a* in the power receiving housing 21. The secondary coil 25 has the form of an elongated ring and extends in the longitudinal direction of the power receiving surface 21*a*. The secondary coil 25 includes a coil surface, which is parallel to the power receiving surface 21*a*. The secondary coil 25 is interlinked with the alternating flux generated by the primary coil 12 to output induced voltage. As shown in FIG. 3, a power circuit 26 and a magnetic plate 24 are arranged near the ornamental surface 21*b* in the power receiving housing 21. The power circuit 26 receives the induced voltage, which is output from the secondary coil 25, through the magnetic plate 24, and converts the induced voltage into predetermined power voltage.

A guide pipe 27, which extends in the downward direction, is fixed to the middle position of the lower surface of the power receiving housing 21. A telescopic pipe 28 is coupled to the guide pipe 27. The telescopic pipe 28 is movable relative to the guide pipe 27 in the axial direction and rotatable about the axis. In one example, the guide pipe 27 is a tube and the telescopic pipe 28 is a square tube having a circular through hole.

One or both of the guide pipe 27 and the telescopic pipe 28 may include a holding mechanism that fixes the telescopic pipe 28 at a desired position and angle on the guide pipe 27. One or both of the guide pipe 27 and the telescopic pipe 28 may also include a separation restriction mechanism that restricts separation of the telescopic pipe 28 from the guide pipe 27.

A device fixture 30 is fixed to the telescopic pipe 28. As shown in FIG. 4, the device fixture 30 is fixed to the front surface of the telescopic pipe 28. The device fixture 30 includes a left vertical frame 31*a* and a right vertical frame 31*b*. The device fixture 30 also includes a first horizontal frame 31*c* and a second horizontal frame 31*d*, which connect the vertical frame 31*a* with the vertical frame 31*b*, and a setting base 31*e*. The device fixture 30 is fixed to the front surface of the telescopic pipe 28 at the middle of the first horizontal frame 31*c* and the second horizontal frame 31*d*.

The liquid crystal television E is placed on the setting base 31*e*. The two sides of the setting base 31*e* each include a support piece 31*f*, which projects in the upward direction. The support pieces 31*f* hold the liquid crystal television E, which is placed on the setting base 31*e*, in cooperation with the vertical frames 31*a* and 31*b*.

The height and angle of the device fixture 30 (and the liquid crystal television E) may be changed by adjusting the position and angle of the telescopic pipe 28 relative to the guide pipe 27. The horizontal position of the device fixture (and the liquid crystal television E) may be changed by adjusting the position of the power receiving housing 21 relative to the power supplying housing 11.

The device fixture 30 includes an outlet 32, which serves as a power supplying port. The outlet 32 includes output terminals T3 and T4 (refer to FIG. 6), which are connected to output terminals T1 and T2 of the power circuit 26 in the power receiving housing 21 through connection wires L1 and L2.

The liquid crystal television E is placed on the setting base 31e of the device fixture 30, and a power plug PL of the liquid crystal television E is inserted into the outlet 32. This supplies the output voltage of the power circuit 26 (refer to FIG. 6) to the liquid crystal television E. When the liquid crystal television E is supplied with power in such a manner, the position of the liquid crystal television E to the wall W in the room R may be changed with a relatively high degree of freedom.

The electric configuration of the power supplying device 10 and the movable device 20 will now be described.

Figure 6:
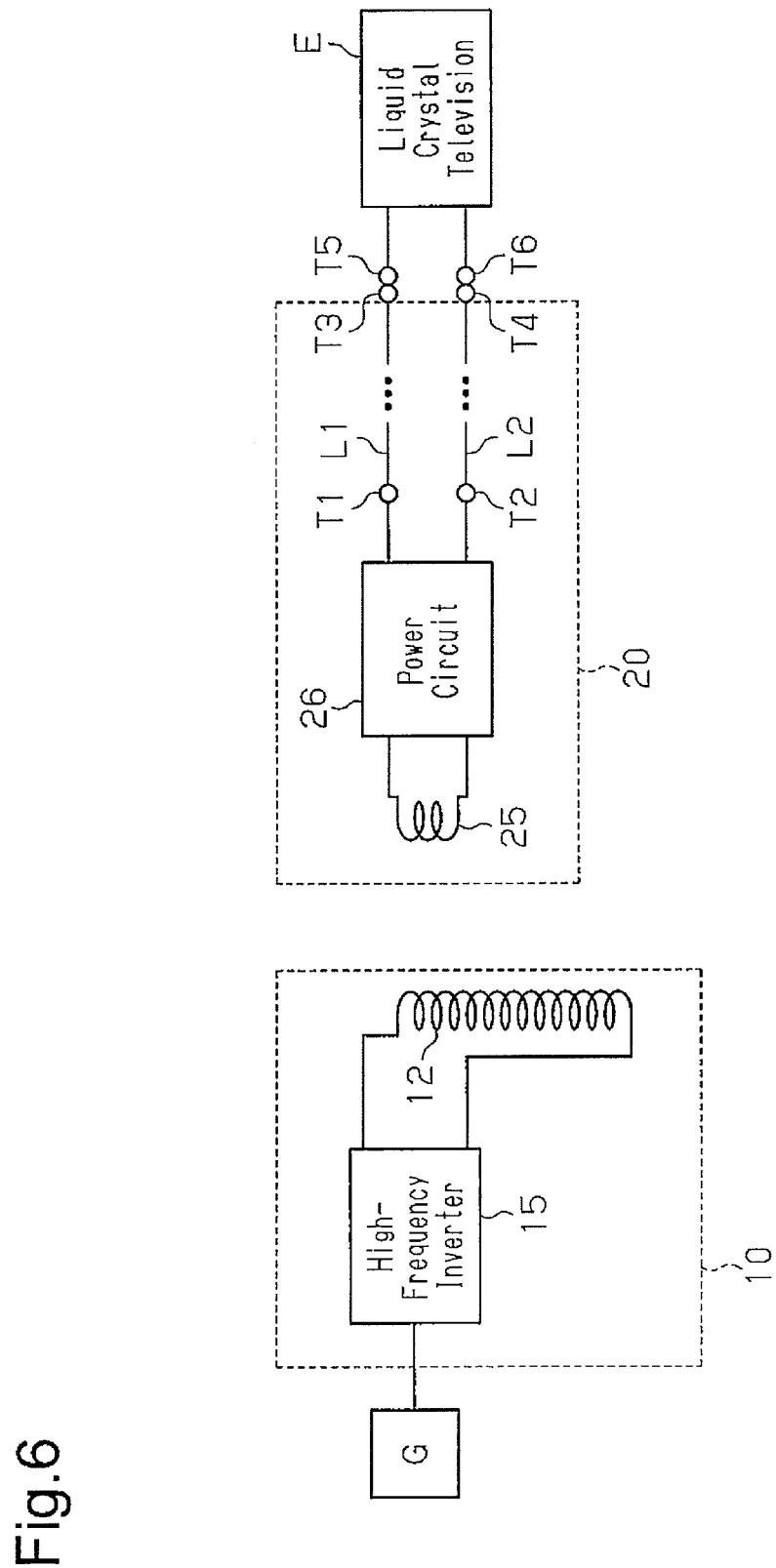
FIG. 6 is an electric block diagram of the contactless power supplying system.

As shown in FIG. 6, the power supplying device 10 includes the high-frequency inverter 15 arranged in the power supplying housing 11. The high-frequency inverter 15 generates high-frequency current from the commercial power supply G. For example, the high-frequency inverter 15 may include a rectification smoothing circuit, which rectifies and smooths the commercial power supply G, and a full-bridge circuit inverter, which converts the DC voltage that is output from the rectification smoothing circuit into high-frequency current. The high-frequency inverter 15, which is connected to the primary coil 12, generates high-frequency current and supplies the generated high-frequency current to the primary coil 12. When receiving the high-frequency current, the primary coil 12 generates alternating flux.

The movable device 20 includes the secondary coil 25, which is arranged in the power receiving housing 21, and the power circuit 26, which is connected to the secondary coil 25. The secondary coil 25 supplies, to the power circuit 26, induced voltage generated when interlinked with the alternating flux of the primary coil 12. As long as the power receiving housing 21 is correctly arranged on the power supplying housing 11, the secondary coil 25 interlinks with alternating flux and outputs induced voltage.

The power circuit 26 generates the output voltage of the movable device 20 from the induced voltage (induced electromotive force) of the secondary coil 25. In one example, the power circuit 26 includes a rectification smoothing circuit, which rectifies and smooths the induced voltage of the secondary coil 25 to generate rectified and smoothed DC voltage, a DC/AC conversion circuit, which converts the smoothed DC voltage into AC voltage having a predetermined peak value and frequency in accordance with the specification of the electronic device mounted on the movable device 20, and the output terminals T1 and T2, which output the AC voltage. In the present embodiment, the power circuit 26 generates output voltage that is substantially the same as the AC voltage of the commercial power supply G and outputs the AC voltage to the output terminals T1 and T2.

The output terminals T1 and T2 are connected to the output terminals T3 and T4 of the outlet 32 through the connection wires L1 and L2. The output terminals T3 and T4 of the outlet 32 are connected to plug terminals T5 and T6 of a power plug PL of the liquid crystal television E. This supplies the liquid crystal television E with AC voltage from the power circuit 26.

The operation of the contactless power supplying system will now be described.

As shown in FIG. 1, the movable device 20 is arranged on the power supplying housing 11, and the liquid crystal television E is set in the device fixture 30 of the movable device 20. When the movable device 20 is moved along the power supplying housing 11, the liquid crystal television E is arranged at a desired sideward position in the room R (wall W). When the telescopic pipe 28 is moved relative to the guide pipe 27 in the axial direction, the liquid crystal television E is arranged at a desired height. The screen of the liquid crystal television E may be directed in a desired orientation by rotating the telescopic pipe 28 about the guide pipe 27. When the power plug PG of the liquid crystal television E is inserted into the outlet 32, the output voltage of the power circuit 26 is supplied to the liquid crystal television E. Thus, the liquid crystal television E does not have to be a dedicated liquid crystal television for a contactless power supplying system incorporating a secondary coil.

The contactless power supplying system of the present embodiment has the advantages described below.

(1) In the contactless power supplying system of the present embodiment, an electronic device does not have to be arranged where an outlet is embedded in the wall W. In addition, the contactless power supplying system of the present embodiment reduces the number of cords that connect the electronic device with the outlet embedded in the wall W. In one example, the guide groove 11d is formed in the coupling surface 11c of the power supplying housing 11. The coupling plate 22 that contacts the coupling surface 11c is arranged on the upper side of the power receiving housing 21, and the projection 23 projects from the coupling plate 22. The projection 23 engages with the guide groove 11d of the coupling surface 11c in a movable manner. This allows the movable device 20 (liquid crystal television E) to be arranged at a desired position in the room R (wall W). The power receiving surface 21a of the power receiving housing 21 faces the power supplying surface 11b of the power supplying housing 11. This ensures the supply of power from the power supplying device 10 to the movable device 20 regardless of where the movable device 20 (liquid crystal television E) is located.

(2) The guide pipe 27 is fixed to the power receiving housing 21 of the movable device 20. The telescopic pipe 28 is coupled to the guide pipe 27. The telescopic pipe 28 is movable in the axial direction of the guide pipe 27 and is rotatable about its axis. The device fixture 30 is connected to the telescopic pipe 28. Thus, the liquid crystal television E that is set in the device fixture 30 may be arranged at a desired height and orientation.

(3) The outlet 32 that can receive the power plug PL of the liquid crystal television E is arranged in the device fixture 30. Thus, the contactless power supplying system is capable of supplying power to a dedicated electronic device for a contactless power supplying system incorporating a secondary coil as well as the liquid crystal television E that is actuated by a normal commercial power supply.

The above embodiment may be modified as follows.

Figure 7:
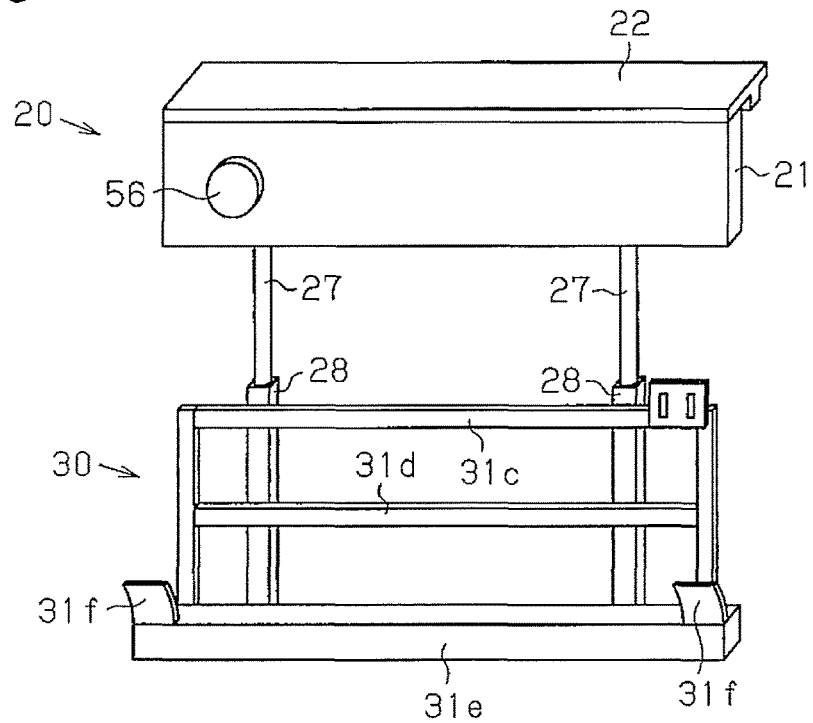
FIG. 7 is a perspective view showing a movable device in another embodiment.

The position adjusting member of the movable device 20 is not limited to the guide pipe 27 and the telescopic pipe 28. In the example of FIG. 7, the position adjusting member includes a plurality of guide pipes 27 and a plurality of telescopic pipes 28. This position adjusting member is effective for supporting a relatively heavy electronic device. However, the orientation of the device fixture 30 (liquid crystal television E) cannot be changed.

Figure 8:
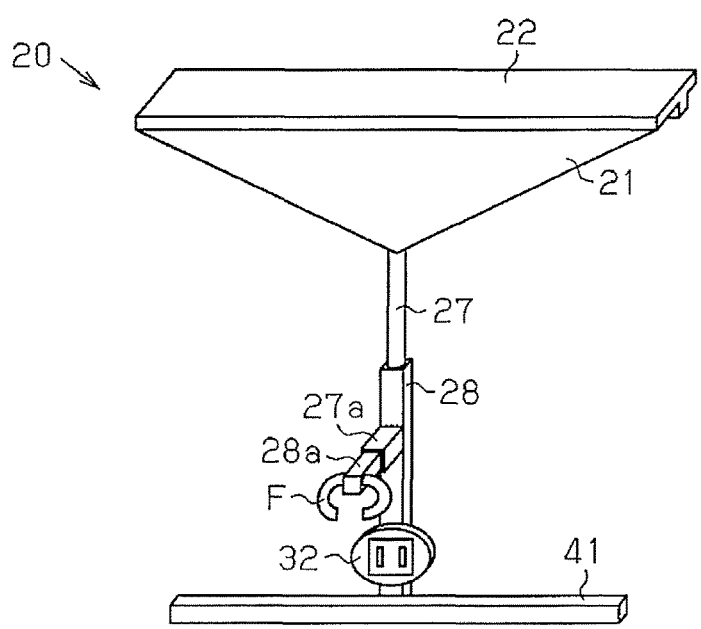
FIG. 8 is a perspective view showing a movable device in a further embodiment.

In the example of FIG. 8, the movable device 20 includes a support base 41, which has the form of a polygonal bar and is fixed to the lower end of the telescopic pipe 28. The outlet 32 and a polygonal second guide pipe 27a, which extends in the frontward direction, are fixed to the telescopic pipe 28. A polygonal second telescopic pipe 28a is coupled to the second guide pipe 27a. The second telescopic pipe 28a is movable relative to the second guide pipe 27a in the longitudinal direction. One or both of the second guide pipe 27a and the second telescopic pipe 28a may include a holding mechanism that fixes the second telescopic pipe 28a at a desired position of the second guide pipe 27a. A hook F is arranged on a distal end of the second telescopic pipe 28a.

In the movable device 20 of FIG. 8, the support base 41 supports the lower side of the liquid crystal television E, and the hook F engages with the rear surface of the liquid crystal television E. The movable device 20 allows the height of the liquid crystal television E to be adjusted by changing the projection length of the telescopic pipe 28. The movable device 20 allows the liquid crystal television E to be inclined about the lower side of the liquid crystal television E by changing the projection length of the second telescopic pipe 28a. This increases the degree of layout freedom for the liquid crystal television E. The movable device 20 of FIG. 8 is suitable not only for the liquid crystal television E but also for an electronic device that requires a relatively high degree of layout freedom, such as a digital photo frame.

Figure 9:
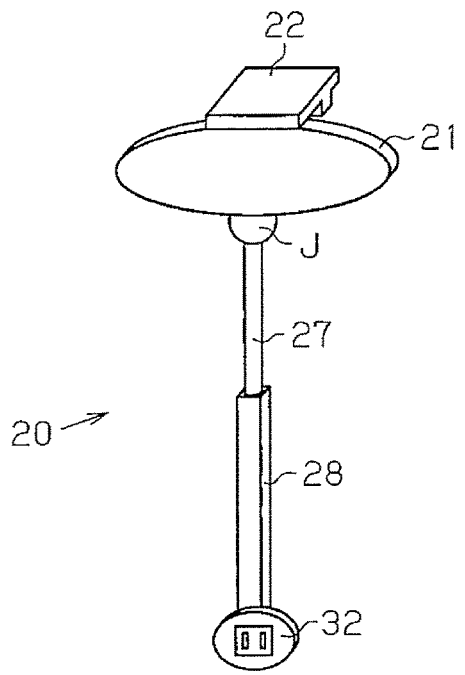
FIG. 9 is a perspective view showing a movable device in a further embodiment.
Figure 16:
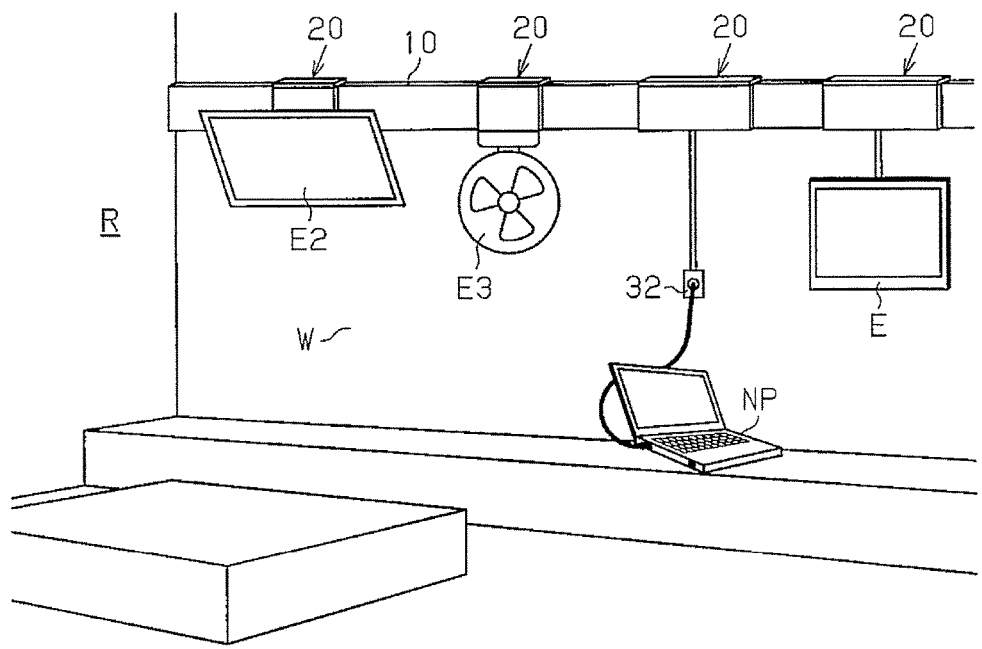
FIG. 16 is a perspective view showing an example of how the contactless power supplying system is used.

In the movable device 20 of the above embodiment, the outlet 32 is arranged in the device fixture 30, which is fixed to the telescopic pipe 28. In the example of FIG. 9, the movable device 20 does not include the device fixture 30, and the outlet 32 is arranged on the lower end of the telescopic pipe 28. As shown in FIG. 16, the movable device 20 of FIG. 9 is located near an electronic device such as a laptop NP. The movable device 20 does not rigidly support an electronic device. The power plug PL of an electronic device is inserted into the outlet 32, which is suspended from the movable device 20, to supply power to the electronic device. The contactless power supplying system including the movable device 20 is capable of supplying power to an electronic device that is located at a position separated from the wall W. This increases the degree of layout freedom for an electronic device.

Figure 12:
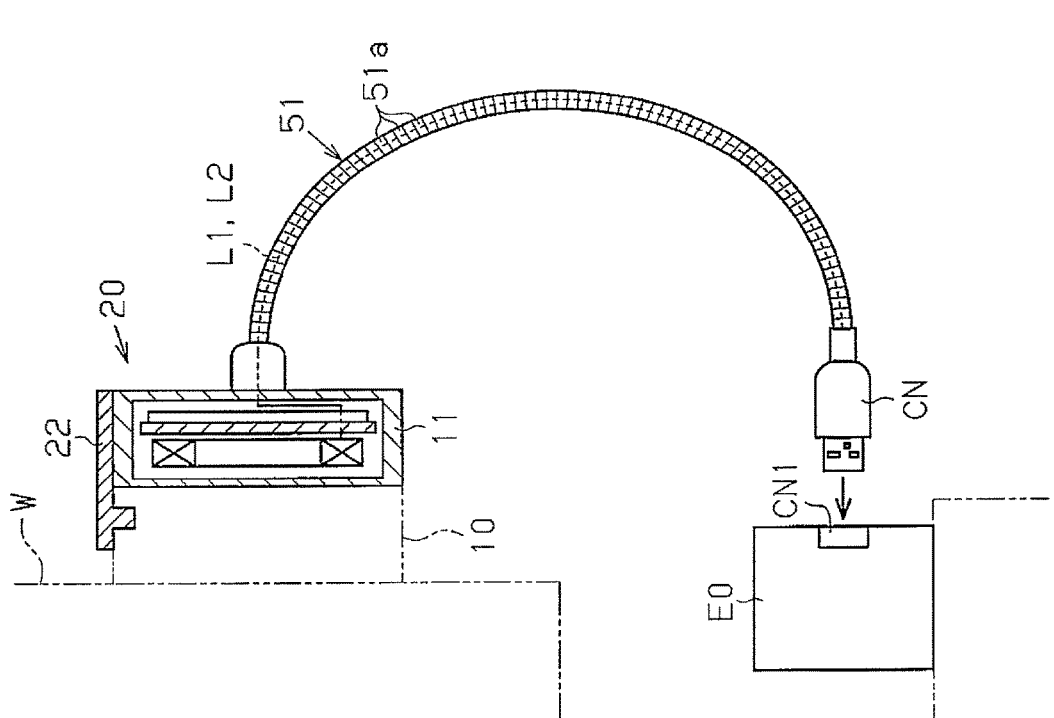
FIG. 12 is a cross-sectional view showing a movable device in a further embodiment.

The lower end of a slide pipe 28 of the movable device 20 may include another jack that can be supplied or a connector CN, which is applicable to a universal serial bus (USB) that serves as a power supplying port shown in FIG. 12, instead of or in addition to the outlet 32. The USB-applicable connector CN of the movable device 20 is connected to an electronic device including a USB terminal and can supply power to a USB electronic device that is separated from the wall W. This increases the degree of layout freedom for an electronic device.

In the example of FIG. 9, the position adjusting member includes a joint J, which allows the angle between the power receiving housing 21 and the guide pipe 27 to be changed, the guide pipe 27, and the telescopic pipe 28. The guide pipe 27 includes a basal end coupled to the power receiving housing 21 by the joint J. Preferably, the joint J is configured to change the angle of the guide pipe 27 when receiving a predetermined force and sustain the changed angle. This increases the movable range of the outlet 32 and the degree of layout freedom for an electronic device. The joint J may be arranged in the movable device 20 shown in FIGS. 4 and 8. The joint J is, for example, a universal joint.

Figure 10:
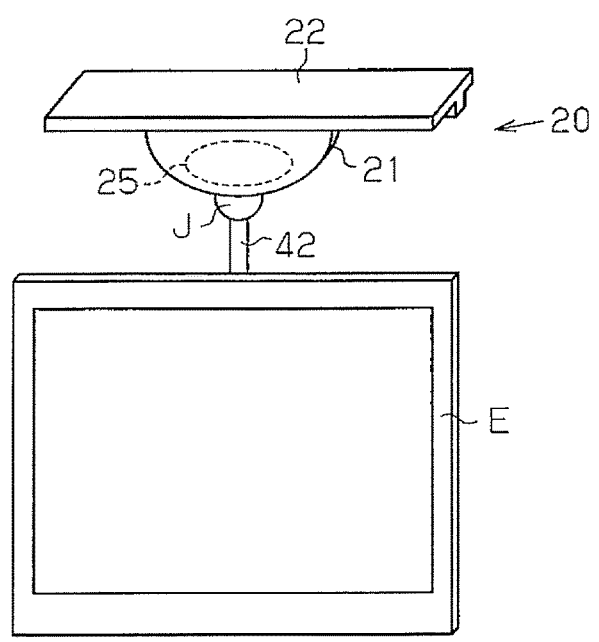
FIG. 10 is a perspective view showing a movable device in a further embodiment.

In the example of FIG. 10, the position adjusting member includes the joint J and a suspension arm 42. The suspension arm 42 is connected to the power receiving housing 21 by the joint J. The liquid crystal television E is coupled to the suspension arm 42.

Figure 11:
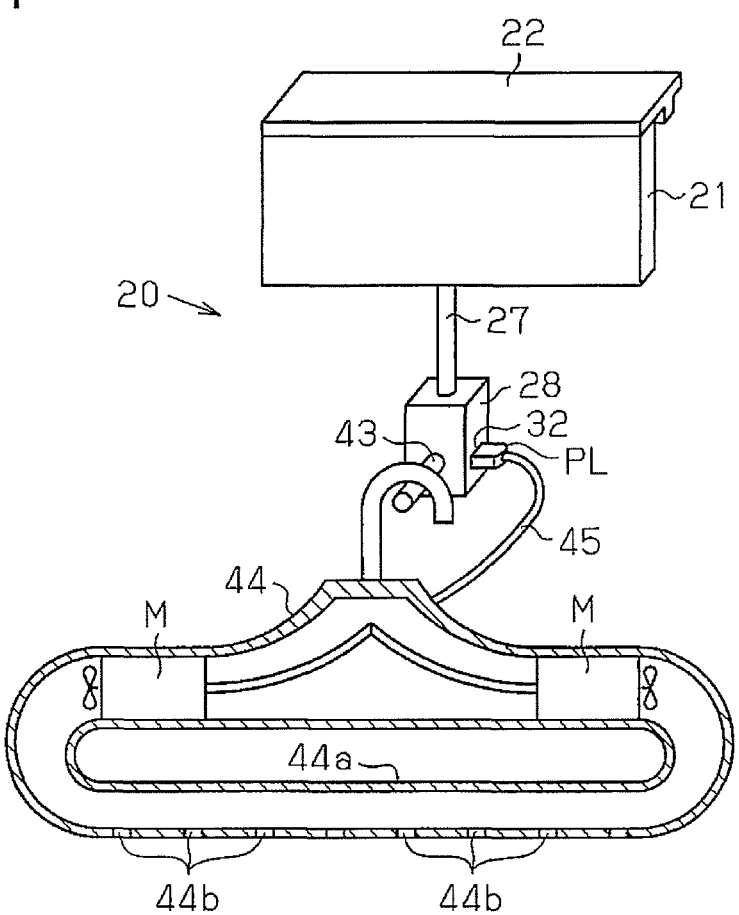
FIG. 11 is a perspective view showing a movable device in a further embodiment.

In the example of FIG. 11, the movable device 20 includes a hooking member 43, which is arranged on the telescopic pipe 28, and the outlet 32. An electronic device such as a blow hanger 44 can be hooked to the hooking member 43. The blow hanger 44 includes a fan motor M incorporated in a hollow hanger body. The power plug PL, which is arranged on a distal end of a cord 45 pulled out of the blow hanger 44, is inserted into the outlet 32 of the telescopic pipe 28 to supply the fan motor M with power. A current of air generated when the fan motor M produces rotation is circulated through the hanger body and discharged in the lower direction from discharge holes 44b, which extend through a lower reinforcement tube 44a. This dries clothes within a shorter period of time. The hooking member 43 of the movable device 20 is arranged at a desired position along the wall W. This increases the degree of layout freedom for the blow hanger 44 and dries clothes quickly at a desired position.

The blow hanger 44 of FIG. 11 is configured to blow cool air. In another example, the blow hanger 44 incorporates a heater configured to blow warm air. The movable device 20 of FIG. 11 includes the hooking member 43 that hooks the blow hanger 44. In another example, the blow hanger 44 is directly fixed to, that is, formed integrally with the power receiving housing 21 of the movable device 20. In a further example, the ornamental surface 21b of the power receiving housing 21 of the movable device 20 has the form of the blow hanger 44.

As shown in FIG. 12, the position adjusting member may be a bellows-type flexible arm 51. The flexible arm 51 includes connectors 51a, which are made of metal or synthetic resin and each have the same form. Each of the connectors 51a includes a spherical end and a concave end. The spherical end of one connector 51a is coupled to the concave surface end of another connector 51a to form the bellows-type flexible arm 51. The concave surface of the concave end and the outer surface of the spherical end are slidable along each other. Preferably, the sliding resistance between the concave surface of the concave end and the outer surface of the spherical end is set so that when the flexible arm 51 is bent into the shape of an arc, the flexible arm 51 remains in the same shape.

The flexible arm 51 of FIG. 12 is a hollow tube including a through hole. The connection wires L1 and L2 are inserted into the through hole so that the connection wires L1 and L2 are not exposed to the outside of the flexible arm 51.

As shown in FIG. 12, a basal end of the bellows-type flexible arm 51 is coupled to the ornamental surface 21b of the power receiving housing 21. A USB-applicable connector CN is arranged on a distal end of the arm 51. The movable device 20 that includes the flexible arm 51 extends the range reached by the USB-applicable connector CN. As a result, the USB-applicable connector CN of the movable device 20 may be connected to a commercially available electronic device E0 including a USB connector CN1 and can supply power to the electronic device E0. This increases the degree of layout freedom for the electronic device E0.

The connection wires L1 and L2 do not necessarily have to be inserted into the through hole of the flexible arm 51. The connection wires L1 and L2 may be, for example, spirally wound on the outer surface of a flexible arm that does not have a through hole and be connected to the USB-applicable connector CN on the distal end the arm 51.

Instead of or in addition to the USB-applicable connector CN, the outlet 32 shown in FIGS. 4 and 8 may be arranged on the distal end of the flexible arm 51.

Figure 13:
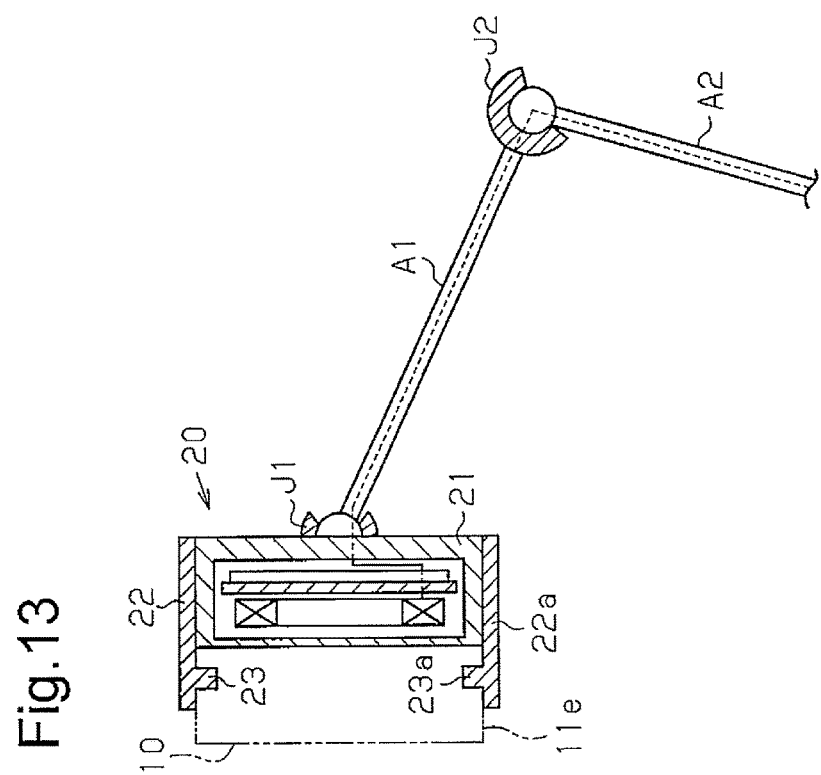
FIG. 13 is a cross-sectional view showing a movable device in a further embodiment.

FIG. 13 shows a position adjusting member for the movable device 20 that includes a first arm A1, a second arm A2, a first joint J1, and a second joint J2. A basal end of the first arm A1 is coupled to the power receiving housing 21 by the first joint J1. A distal end of the first arm A1 is coupled to a basal end of the second arm A2 by the second joint J2. The outlet 32 and the USB-applicable connector CN are arranged on a distal end of the second arm A2.

It is preferred that the joint J1 be configured to change the angle of the first arm A1 when receiving a predetermined force and to sustain the changed angle. In the same manner, it is preferred that the joint J2 be configured to change the angles of the first arm A1 and the second arm A2 when receiving a predetermined force and to sustain the changed angles.

FIGS. 14A and 14B shows a position adjusting member for the movable device 20 that includes telescopic pipes P1, P2, and P3 and a joint J. A distal end of the telescopic pipe P1 having the smallest diameter is coupled to the ornamental surface 21b of the power receiving housing 21. The outlet 32 or the USB-applicable connector CN is arranged on a basal end of the telescopic pipe P3 having the largest diameter.

Preferably, the telescoping resistance of the telescopic pipes P1, P2, and P3 are set so that the entire length of the pipes P1, P2, and P3 can be changed when receiving a predetermined force and the changed length can be sustained. In the same manner, it is preferred that the joint J be configured to change the angles of the ornamental surface 21b and the pipe P1 when receiving a predetermined force and sustain the changed angles.

The position adjusting member of FIG. 14 can orient a distal end of the telescopic pipe P3 to a desired direction and sustain the position and direction. In this condition, the outlet 32 or the USB-applicable CN may be connected to a power plug of a commercial electronic device to supply power to the electronic device.

It is preferred that the power receiving housing 21 include a reel, around which the connection wires L1 and L2 are wound in the power receiving housing 21 when the telescopic pipes P1, P2, and P3 are contracted. This reel is configured so that the wound connection wires L1 and L2 are unwound from the reel when the telescopic pipes P1, P2, and P3 are expanded.

The position adjusting member may be a pantograph.

The position adjusting member is not limited to the structures described in the embodiment and the modified examples as long as the position adjusting member may be changed in shape and be able to be fixed as a unit.

Figure 15:
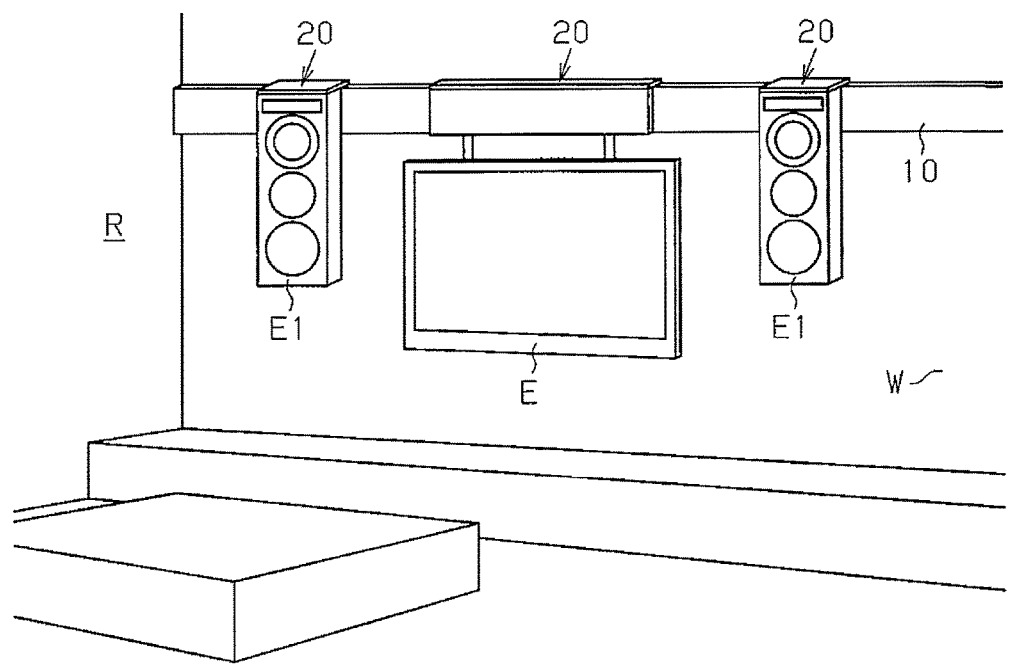
FIG. 15 is a perspective view showing an example of how the contactless power supplying system is used.
Figure 17:
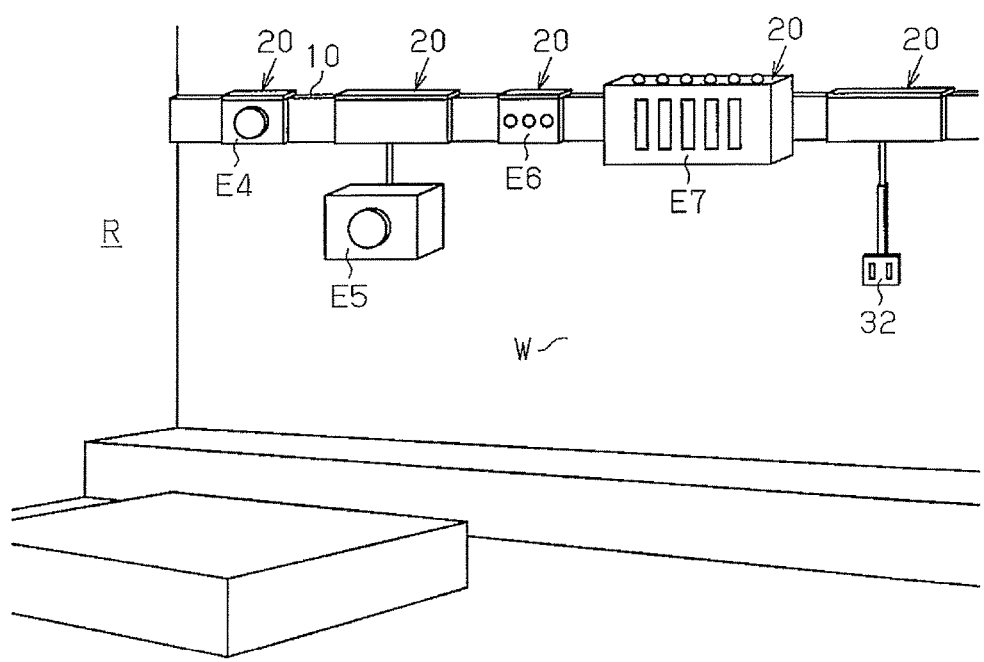
FIG. 17 is a perspective view showing an example of how the contactless power supplying system is used.

As shown in FIGS. 15 to 17, a plurality of the movable devices 20 may be set on the power supplying housing 11 of the power receiving device 10. In the example of FIG. 15, a plurality of electronic devices (wall-hung speakers E1 and a wall-hung television E) are supported by the movable devices 20 and supplied with power. The contactless power supplying system allows a user to arrange a video device and an audio device at any position in a room R, which is suitable for a home theater.

In the example of FIG. 16, a plurality of electronic devices (wall-hung light E2, wall-hung fan E3, and wall-hung television E) are supported by corresponding movable devices 20 and supplied with power. A wall-hung outlet 32 of one of the movable devices 20 supplies power to the laptop NP. The contactless power supplying system realizes a room R in which a user can arrange a plurality of electronic devices at any position.

In the example of FIG. 17, a plurality of electronic devices (wall-hung planetarium E4, wall-hung projector E5, wall-hung air-conditioner sensor E6, and wall-hung air purifier E7) are supported by corresponding movable devices 20 and supplied with power. A wall-hung outlet 32 of one of the movable devices 20 supplies power to another electronic device where necessary. The contactless power supplying system realizes a room R in which a user can arrange a plurality of electronic devices at any position.

In the above embodiment, the power supplying device 10 includes the guide groove 11d formed only in the coupling surface 11c, which is the upper surface of the power supplying housing 11. In the example of FIG. 18C, the power supplying device 10 includes the guide groove 11d, which is formed on the coupling surface 11c, and a second guide groove 11f, which is formed on a surface (lower surface 11e) opposite to the coupling surface 11c. The movable device 20 shown in FIG. 13 includes a second coupling plate 22a, which is arranged on the lower surface of the power receiving housing 21. The second coupling plate 22a includes a second projection 23a that engages the second guide groove 11f, which is formed in the lower surface of the power supplying housing 11. The guide 11f and the projection 23a function as a guide portion and a guided portion, respectively. The second coupling plate 22a functions as a coupling member. The projection 23 and the second projection 23a of the power receiving housing 21 engage the guide groove 11d and the second guide groove 11f formed on the coupling surface 11c and the lower surface 11e of the power supplying housing 11, respectively. As a result, the power receiving housing 21 (movable device 20) is rigidly coupled to the power supplying housing 11 in a movable manner while sandwiching the upper surface and the lower surface of the power supplying housing (power supplying device 10).

For example, when the power supplying housing 11 (power supplying device 10) of FIG. 18C is arranged on the ceiling of the room R, the power receiving housing 21 (movable device 20) moves along the power receiving housing 21 without falling off the power supplying housing 11 (power supplying device 10).

In the example of FIG. 18A, the power supplying housing (power supplying device 10) includes a guide rail 52, which is formed on the coupling surface 11c and extends in the longitudinal direction. In the example of FIG. 18B, the power supplying housing 11 (power supplying device 10) includes the guide rail 52 and a second guide rail 52a formed on the coupling surface 11c and the lower surface 11e, respectively. The power supplying device 10 of FIGS. 18A and 18B can be used together with a movable device 20 that includes the coupling plate 22 and the second coupling plate 22a, which have recesses corresponding to the guide rail 52 and the second guide rail 52a.

The front surface of the power receiving housing 21 does not have to be tetragonal and may be changed to have any of a variety of shapes, to be triangular as shown in FIG. 8, oval as shown in FIG. 9, and semi-oval as shown in FIG. 10.

In the above embodiment, the power supplying device 10 includes the single primary coil 12 in the power supplying housing 11. The primary coil 12 forms a single elongated coil surface that faces the power supplying surface 11b and extends in a certain direction. In the example of FIG. 19A, the primary coil 12 is a single coil that forms a plurality of coil surfaces arranged in a certain direction in the power supplying housing 11. The middle position of one coil surface is deviated from the middle position of the adjacent coil surface.

In the example of FIG. 19B, the primary coil 12 is an array of a plurality of primary coils arranged in a certain direction in the power supplying housing 11. Each primary coil forms a coil surface that faces a power supplying surface. As shown in FIG. 19B, a high-frequency inverter 15 is provided for each primary coil 12.

The power supplying housing 11 of the power supplying device 10 do not necessarily have to be arranged horizontally on the wall W. Instead, the power supplying housing 11 may be arranged obliquely on the wall W.

Figure 20:
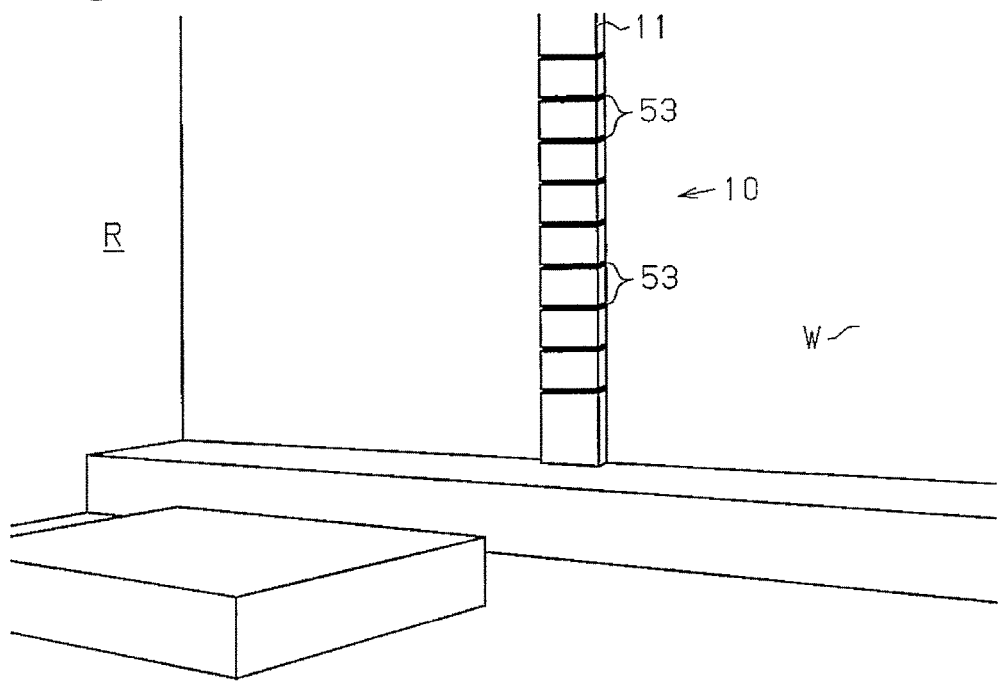
FIG. 20 is a perspective view showing a contactless power supplying system in a further embodiment.
Figure 21:
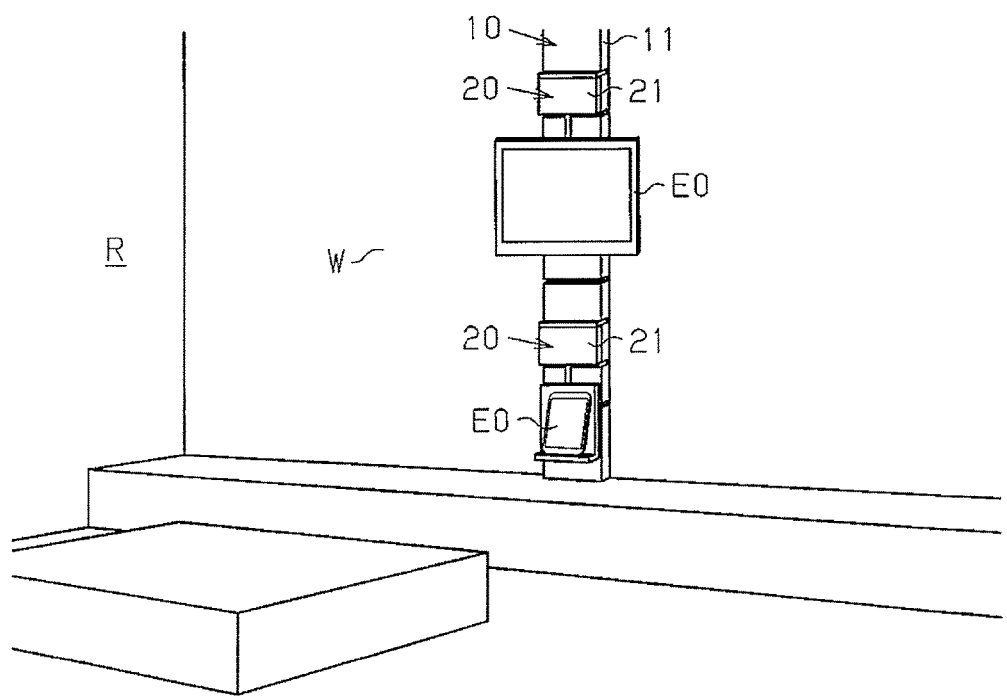
FIG. 21 is a perspective view showing an example of how the contactless power supplying system of FIG. 20 is used.

As shown in FIGS. 20 and 21, the power supplying housing 11 may be arranged vertically. The power supplying surface 11b of the power supplying housing 11 includes a plurality of horizontal support grooves 53, which are formed at equal intervals in the vertical direction. A lower surface of each support groove 53 includes the guide groove 11d.

When the coupling plate 22 of the movable device 20 is inserted into the support groove 53, the projection 23 engages the guide groove 11d of the support groove 53, and the movable device 20 (power receiving housing 21) is arranged on the power supplying housing 11 as shown in FIG. 21. A user may arrange the movable device 20 at any height by inserting the coupling plate 22 of the movable device 20 into any support groove 53. As shown in FIG. 21, a user may arrange a plurality of the power supplying devices 20 on the power supplying housing 11 to supply power to a plurality of electronic devices E0.

Figure 22A:
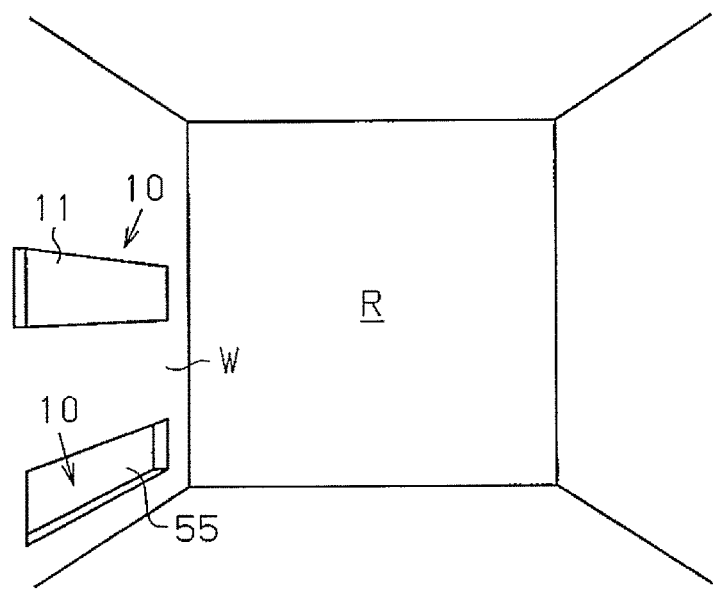
FIG. 22A is a perspective view showing a contactless power supplying system in a further embodiment.
Figure 22B:
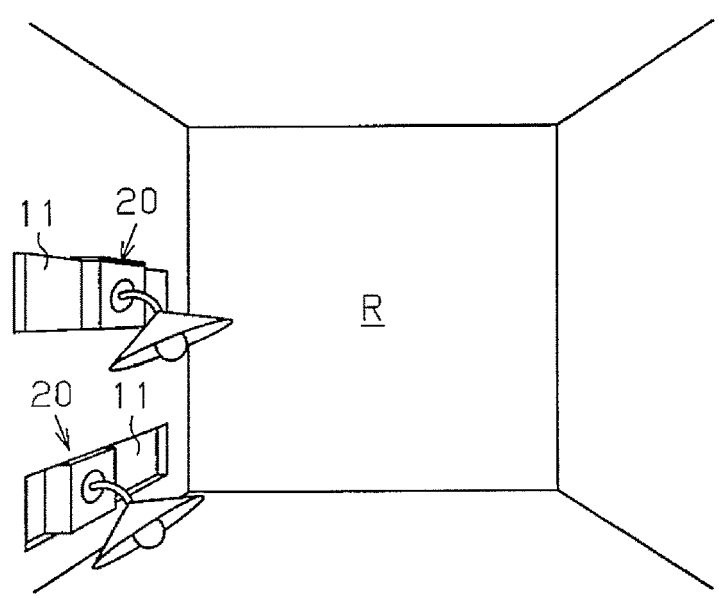
FIG. 22B is a perspective view showing an example of how the contactless power supplying system of FIG. 22A is used.

The power supplying housing 11 of the power supplying device 10 does not necessarily have to be fixed to the wall W. As shown in FIGS. 22A and 22B, the front surface of the power supplying housing 11 may be exposed or projected from the wall W and the remaining portions of the power supplying housing 11 may be embedded in the wall, and the movable device 20 may be arranged on the power supplying device 10. As shown in FIGS. 22A and 22B, the movable device 20 may also be arranged on the power supplying device 10 that is set in a recess 55 of the wall W.

In the above embodiment, the power supplying housing 11 of the power supplying device 10 is fixed to the wall W. Instead, the power supplying device may be integrated with or incorporated in, for example, the pillar or beam of a building, the structural material of a frame, the functional material of a lintel, or a partition material having an aesthetic appeal. This makes the power supplying device unnoticeable and improves the design of a room.

The location where the power supplying device 10 is set is not particularly limited. The power supplying device 10 may be arranged on a ceiling or a floor. The power supplying device 10 may also be arranged on the wall of, for example, a bathroom, a hallway, or stairway. Further, the power supplying device 10 may be arranged indoor or outdoor.

In the above embodiment, as shown in FIG. 7, the ornamental surface 21b of the power receiving housing 21 may include an indicator lamp 56 that indicates the condition of the power received from the power supplying device 10.

In the above embodiment, the high-frequency inverter 15 may stop supplying power to the primary coil 12 if a metal detection sensor arranged on the power supplying surface 11b of the power receiving housing 11 detects a metal foreign matter. The power supplying device 10 or the movable device 20 may indicate the detection of a metal foreign matter with a buzzer or a lamp.

In the above embodiment, the power supplying device 10 may include a detector that detects the movable device 20, and the power supplying device 10 and the movable device 20 may include a communication function. For example, the power supplying device 10 may start supplying power only when detecting the movable device 20 and acknowledging that the movable device 20 is the correct movable device. When a plurality of the primary coils 12 are arranged side by side in the power supplying device 10 as shown in FIG. 19B, the contactless power supplying system having one or both of the detection function and the communication function can execute power supplying control that selectively supplies power only to the primary coil 12 that faces the power receiving surface 21a of the power receiving housing 21 to save power. Such power supplying control includes activating only the high-frequency inverter 15 corresponding to the primary coil 12 that faces the power receiving surface 21a of the movable device 20 in accordance with the position of the detected movable device 20.

In the above embodiment, the high-frequency inverter 15 receives commercial power. Instead, the high-frequency inverter 15 may receive DC power from, for example, a rechargeable battery. This does not require a rectification circuit or a smoothing circuit. A DC/DC converter may need to be provided in the DC power supply such as a rechargeable battery.

In the above embodiment, the high-frequency inverter 15 does not necessarily have to be arranged in the power supplying housing 11. Instead, the high-frequency inverter 15 may be arranged outside the power supplying housing 11.

In the above embodiment, the projection 23 and the guide groove 11 guide the movement of the movable device 20. The projection 23 and the guide groove 11d do not have to be formed in any particular shape and may have a triangular cross-section. In another example, the coupling plate 22 may include a wheel or a roller instead of the projection 23. When the wheel or roller is rolled along the guide groove 11d, the movement of the movable device 20 is guided. The wheel or roller may be driven by a motor arranged in the movable device 20 (for example, coupling plate 22). The movable device 20 may also include a drive control circuit that drives the motor, and a receiver that receives a signal for controlling the drive control circuit. A user can move the movable device 20 away from the movable device 20 to a desired position by, for example, operating a portable remote controller and controlling the rotation direction and drive time of a motor. The remote controller may be a mobile phone.

The position adjusting members of the above embodiment and some of the modified examples may be omitted. The connection wires L1 and L2 extend out of the power receiving housing 21. The outlet 32 (USB-applicable connector CN) arranged on the distal ends of the connection wires L1 and L2 is suspended from the power receiving housing 21.

In the above embodiment, the power circuit 26 generates AC voltage of a peak value and frequency in accordance with the electronic device mounted on the movable device 20. Instead, the power circuit 26 may generate DC voltage in accordance with the mounted electronic device.

The power circuit 26 may be configured to generate plural types of output voltage (including AC power and DC power). The power circuit 26 may output the output voltage that is switched in accordance with an electronic device mounted on the movable device 20. Thus, the single movable device 20 may correspond to a variety of electronic devices that have different specifications.

The power circuit 26 does not necessarily have to be arranged in the power receiving housing 21. Instead, the power circuit 26 and the outlet 32 may be arranged in the position adjusting member. The power circuit 26 and the outlet 32 may be arranged in the device fixture 30.

The above embodiment is an example in which an electronic device is mounted on the movable device 20. Instead, an electronic device may have the function and structure of a power receiving housing including a movable device mechanism, the secondary coil 25, and the power circuit 26.

The above embodiment and modified examples may be combined.

The invention claimed is:

1. A contactless power supplying system comprising:
a power supplying device including
a power supplying housing including a front surface, which is a power supplying surface that extends in a certain direction, and
a primary coil arranged in the power supplying housing and extending in the certain direction, wherein the primary coil is configured to generate alternating flux when receiving high-frequency current; and
a movable device including:
a power receiving housing including a rear surface, which is a power receiving surface,
a coupling member arranged on an upper surface of the power receiving housing so that the power receiving housing is arranged at a certain position where the power receiving surface faces the power supplying surface,
a secondary coil arranged in the power receiving housing, wherein the secondary coil is configured to interlink with the alternating flux and generate induced voltage,
a power circuit arranged in the power receiving housing, wherein the power circuit is configured to generate output voltage from the induced voltage, and
an output terminal extending out of the power receiving housing via a connection wire, wherein the output terminal is configured to output the output voltage of the power circuit,
wherein the coupling member includes a portion that a) extends above an upper surface of the power supply housing and b) includes a guided projection, wherein the upper surface of the power supplying housing, which is a coupling surface, includes a guide portion that is configured to guide movement of the power receiving housing and the coupling member in the certain direction by engaging in a movable manner with the guided projection.

2. The contactless power supplying system according to claim 1, wherein the primary coil faces the power supplying surface in the power supplying housing and forms a single elongated coil surface extending in the certain direction.

3. The contactless power supplying system according to claim 1, wherein
the primary coil forms a plurality of coil surfaces arranged in the certain direction in the power supplying device, and
a middle position of one of the coil surfaces is deviated from a middle position of an adjacent coil surface in the certain direction.

4. The contactless power supplying system according to claim 1, wherein
the primary coil is an array of a plurality of primary coils arranged in the certain direction in the power supplying device, and
each of the primary coils forms a coil surface that faces the power supplying surface.

5. The contactless power supplying system according to claim 1, wherein the movable device includes a position adjusting member that changes one or both of a position and a direction of the output terminal relative to the power receiving housing.

6. The contactless power supplying system according to claim 5, wherein the output terminal is attached to the position adjusting member.

7. The contactless power supplying system according to claim 5, comprising a fixture arranged on the position adjusting member, wherein the fixture holds an electronic device, and the output terminal is attached to the fixture.

8. The contactless power supplying system according to claim 1, wherein the contactless power supplying system is configured so that a plurality of the movable devices are arranged on the power supplying housing of the power supplying device.

9. The contactless power supplying system according to claim 1, wherein the position member is configured to engage the power supplying housing so that the power receiving housing is arranged on the power supplying housing in a removable manner.

10. The contactless power supplying system according to claim 1, wherein
the movable device includes a power supplying port corresponding to a power plug or a connector of an electronic device, and
the output terminal is an electrode of the power supplying port.

11. A contactless power supplying system used with an electronic device, comprising:
a power supplying device including:
a power supplying housing including a front surface, which is a power supplying surface that extends in a certain direction, and
a primary coil including a coil surface arranged in the power supplying housing in the certain direction, wherein the primary coil is configured to generate alternating flux when receiving high-frequency current; and
a movable device including:
a power receiving housing including a rear surface, which is a power receiving surface,
a coupling member arranged on an upper surface of the power receiving housing so that the power receiving housing is arranged at a certain position where the power receiving surface faces the power supplying surface,
a position adjusting member connected to the power receiving housing to adjust one or both of a relative position and a relative angle of the power receiving housing and an electronic device,
a secondary coil arranged in the power receiving housing, wherein the secondary coil is configured to interlink with the alternating flux and generate induced voltage,
a power circuit arranged in the power receiving housing, wherein the power circuit is configured to generate output voltage from the induced voltage output from the secondary coil, and
an output terminal arranged in the power receiving housing, wherein the output terminal is configured to output the output voltage of the power circuit, wherein the coupling member includes a portion that a) extends above an upper surface of the power supply housing and b) includes a guided projection, wherein the upper surface of the power supplying housing, which is a coupling surface, includes a guide portion that is configured to guide movement of the power receiving housing and the coupling member in the certain direction by engaging in a movable manner with the guided projection.

12. The contactless power supplying system according to claim 11, further comprising a fixture arranged in the position adjusting member, wherein the fixture holds the electronic device, and the power circuit and the output terminal are arranged in the fixture.

13. A movable device for use with a power supplying device, wherein the power supplying device includes a power supplying housing including a front surface, which is a power supplying surface that extends in a certain direction, and an upper surface, which is a coupling surface and a primary coil, which is arranged in the power supplying housing in the certain direction, the primary coil is configured to generate alternating flux when receiving high-frequency current, the movable device comprising:
- a power receiving housing including a rear surface, which is a power receiving surface;
- a coupling member arranged on an upper surface of the power receiving housing so that the power receiving housing is arranged at a certain position where the power receiving surface faces the power supplying surface;
- a secondary coil arranged in the power receiving housing, wherein the secondary coil is configured to interlink with the alternating flux and generates induced voltage;
- a power circuit arranged in the power receiving housing, wherein the power circuit is configured to generate output voltage from the induced voltage; and
- an output terminal extending out of the power receiving housing via a connection wire, wherein the output terminal is configured to output the output voltage of the power circuit, wherein
- the coupling member includes a portion that a) extends above the upper surface of the power supplying housing and b) includes a guided projection configured to engage in a movable manner with a guide portion included in the upper surface of the power supplying housing to guide movement of the power receiving housing and the coupling member in the certain direction.

14. The movable device according to claim 13, further comprising a position adjusting member connected to the power receiving housing to change one or both of a position and a direction of the output terminal relative to the power receiving housing.

15. The movable device according to claim 14, wherein the output terminal is attached to the position adjusting member.

16. The contactless power supplying system according to claim 14, further comprising a fixture arranged on the position adjusting member, wherein the fixture holds an electronic device that receives power from the output terminal, and the output terminal is attached to the fixture.

17. The movable device according to claim 13, wherein a hanger is formed integrally with or suspended from the power receiving housing.

18. The movable device according to claim 17, wherein
- the hanger includes a hanger body and a fan motor, which is arranged in the hanger body and connected to the output terminal, and
- the hanger body includes a discharge hole that discharges a current, which is generated by the fan motor, out of the hanger body.

19. The movable device according to claim 13, further comprising an indicator lamp that indicates a condition of power received from the power supplying device.

20. A method of controlling power supplied to a contactless power supplying system including
- a power supplying device including:
  - a power supplying housing including a front surface, which is a power supplying surface that extends in a certain direction, and an upper surface, which is a coupling surface; and
  - a plurality of primary coils arranged in the power supplying housing in the certain direction, wherein the plurality of primary coils is configured to generate alternating flux when receiving high-frequency current, and each of the primary coils forms a coil surface that faces the power supplying surface, and
- a movable device including:
  - a power receiving housing including a rear surface, which is a power receiving surface;
  - a coupling member arranged on an upper surface of the power receiving housing so that the power receiving housing is arranged at a certain position where the power receiving surface faces the power supplying surface;
  - a secondary coil arranged in the power receiving housing, wherein the secondary coil is configured to interlink with the alternating flux and generates induced voltage;
  - a power circuit arranged in the power receiving housing, wherein the power circuit is configured to generate output voltage from the induced voltage; and
  - an output terminal that extends out of the power receiving housing via a connection wire, wherein the output terminal outputs the output voltage of the power circuit, wherein
  - the upper surface of the power supplying housing comprises a guide portion that guides movement of the power receiving housing and the coupling member in the certain direction, and
  - the coupling member includes a portion that a) extends above the upper surface of the power supplying housing and b) comprises a guided projection configured to engage in a movable manner with the guide portion of the power supplying housing,
- the method comprising selectively supplying high-frequency current to the one of the plurality of primary coils that faces the power receiving surface of the power receiving housing with the guided projection of the movable device engaged with the guide portion of the power supplying device.

* * * * *